US010725962B2

(12) United States Patent
Mao et al.

(10) Patent No.: US 10,725,962 B2
(45) Date of Patent: Jul. 28, 2020

(54) ELECTRONIC DEVICE AND USAGE METHOD THEREOF

(71) Applicant: ASUSTeK COMPUTER INC., Taipei (TW)

(72) Inventors: Tzu-Jen Mao, Taipei (TW); Kuan-Pei Lee, Taipei (TW); Fu-Yu Cai, Taipei (TW); Chieh Mii, Taipei (TW); Ya-Yun Huang, Taipei (TW); Ming-Chih Huang, Taipei (TW); Tong-Shen Hsiung, Taipei (TW); Shang-Chih Liang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/524,278

(22) Filed: Jul. 29, 2019

(65) Prior Publication Data

US 2020/0081863 A1    Mar. 12, 2020

(30) Foreign Application Priority Data

Sep. 10, 2018   (TW) .............................. 107131779 A

(51) Int. Cl.
G06F 15/02           (2006.01)
(52) U.S. Cl.
CPC ...... G06F 15/0216 (2013.01); G06F 15/0208 (2013.01); G06F 15/0225 (2013.01)
(58) Field of Classification Search
CPC combination set(s) only.
See application file for complete search history.

(56) References Cited

U.S. PATENT DOCUMENTS

| 4,890,832 A | * | 1/1990 | Komaki | G06F 3/0238 235/146 |
| 5,726,684 A | * | 3/1998 | Blankenship | G06F 1/1616 345/163 |
| 6,219,227 B1 | * | 4/2001 | Trane | G06F 1/1616 312/223.2 |
| 6,538,880 B1 | * | 3/2003 | Kamijo | G06F 1/1616 248/65 |
| 6,545,667 B1 | * | 4/2003 | Lilenfield | G06F 1/1616 345/157 |
| 6,658,271 B1 | | 12/2003 | Wu | |
| 6,961,237 B2 | * | 11/2005 | Dickie | G06F 1/1616 345/158 |

(Continued)

FOREIGN PATENT DOCUMENTS

CN        200997089 Y     12/2007

OTHER PUBLICATIONS https://baijiahao.baidu.com/s?id=1589307631156897257&wfr=spider&for=pc.

*Primary Examiner* — Lisa Lea-Edmonds
(74) *Attorney, Agent, or Firm* — McClure, Qualey & Rodack, LLP.

(57) ABSTRACT

An electronic system and a control method thereof are provided. The electronic system includes a first device, a second device and a control device. The first device includes a first processor and a first control module, and the first control module is electrically connected to the first processor. The second device is detachably disposed on the first device. The second device includes a second processor and a second control module, and the second control module is electrically connected to the second processor. The control device is detachably connected to the second device, and the first device, the second device and the control device are coupled to each other.

11 Claims, 6 Drawing Sheets

(56) References Cited

U.S. PATENT DOCUMENTS

| | | | | |
|---|---|---|---|---|
| 7,948,741 B2* | 5/2011 | Fan | ............ | G06F 1/169 |
| | | | | 361/679.1 |
| 8,279,591 B2* | 10/2012 | Chiu | ............ | G06F 1/1688 |
| | | | | 361/679.02 |
| 8,537,541 B2* | 9/2013 | Zhang | ............ | G06F 1/169 |
| | | | | 345/157 |
| 8,630,088 B2* | 1/2014 | Collopy | ............ | G06F 1/1616 |
| | | | | 361/679.55 |
| 8,693,175 B2* | 4/2014 | Lee | ............ | G06F 1/1616 |
| | | | | 248/220.41 |
| RE45,157 E* | 9/2014 | Mathurin | ............ | H04N 5/765 |
| | | | | 348/838 |
| 9,201,576 B2* | 12/2015 | Chen | ............ | G06F 3/04842 |
| 2001/0033267 A1 | 10/2001 | Kim et al. | | |
| 2003/0198010 A1* | 10/2003 | Homer | ............ | G06F 1/1616 |
| | | | | 361/679.55 |
| 2004/0100449 A1* | 5/2004 | Chuang | ............ | G06F 1/1616 |
| | | | | 345/173 |
| 2008/0074838 A1* | 3/2008 | Chou | ............ | G06F 1/1671 |
| | | | | 361/679.4 |
| 2009/0021903 A1* | 1/2009 | Chen | ............ | G06F 1/1656 |
| | | | | 361/679.55 |
| 2009/0036189 A1* | 2/2009 | Wang | ............ | A63F 13/24 |
| | | | | 463/16 |
| 2010/0045606 A1* | 2/2010 | Liu | ............ | G06F 1/1616 |
| | | | | 345/168 |
| 2011/0075339 A1* | 3/2011 | Lam | ............ | G06F 1/1632 |
| | | | | 361/679.09 |
| 2013/0282786 A1* | 10/2013 | Chen | ............ | H04W 4/50 |
| | | | | 709/201 |
| 2013/0322014 A1* | 12/2013 | Liu | ............ | G06F 1/1656 |
| | | | | 361/679.55 |
| 2014/0099163 A1* | 4/2014 | Chuang | ............ | G06F 1/1626 |
| | | | | 403/374.1 |

* cited by examiner

ELECTRONIC DEVICE AND USAGE METHOD THEREOF

CROSS-REFERENCE TO RELATED APPLICATION

This application claims the priority benefit of Taiwan Application Serial No. 107131779, filed on Sep. 10, 2018. The entirety of the above-mentioned patent application is hereby incorporated by reference herein and made a part of specification.

BACKGROUND OF THE INVENTION

Field of the Invention

The disclosure relates to an electronic device, more particularly, to an electronic device including a plurality of apparatuses cooperating with each other.

Description of the Related Art

With the popularity of electronic devices, it is common for people to carry more than one electronic device with them. However, there is less cooperation between the various electronic devices in general. In other words, when an application is executed on a mobile phone, a touch screen or a keyboard is utilized. When an application is executed on a computer, a keyboard or a mouse has to be used. It cannot provide a variety of usage modes by a single device due to different needs of users.

BRIEF SUMMARY OF THE INVENTION

The disclosure provides an electronic system, including a first device, a second device and a control device. The first device includes a first processor and a first control module, and the first control module is electrically connected to the first processor. The second device is detachably disposed on the first device. The second device includes a second processor and a second control module, and the second control module is electrically connected to the second processor. The control device is detachably disposed on the second device, and the first device, the second device and the control device are coupled to each other.

The disclosure further provides a control method of an electronic system, including turning on a first device; detecting whether the first device is combined with a second device or a control device or not; when the first device is combined with the second device, the first device connects to the second device, and the first device cooperates with the second device; and when the first device is combined with the control device, the first device communicates with the control device, and the control device controls the first device.

The detailed descriptions of other effects and embodiments of the disclosure are provided below with reference to the accompanying drawings.

BRIEF DESCRIPTION OF THE DRAWINGS

To more clearly describe the technical solutions in the embodiments of the disclosure or in the prior art, the following will briefly introduce the drawings required for describing the embodiments or the prior art. It is apparent that the drawings in the following description are only some embodiments described in the disclosure, and a person of ordinary skill in the art obtains other drawings on the basis of these drawings without any creative effort.

DETAILED DESCRIPTION OF THE EMBODIMENTS

Specific embodiments of this application will be further described below with reference to schematic drawings. It should be noted that the accompanying drawings are in a simplified form and not drawn to scale, are provided only for convenience and clarity of illustration of the embodiments of this application, and are not intended to be limiting of this application.

Figure 1:
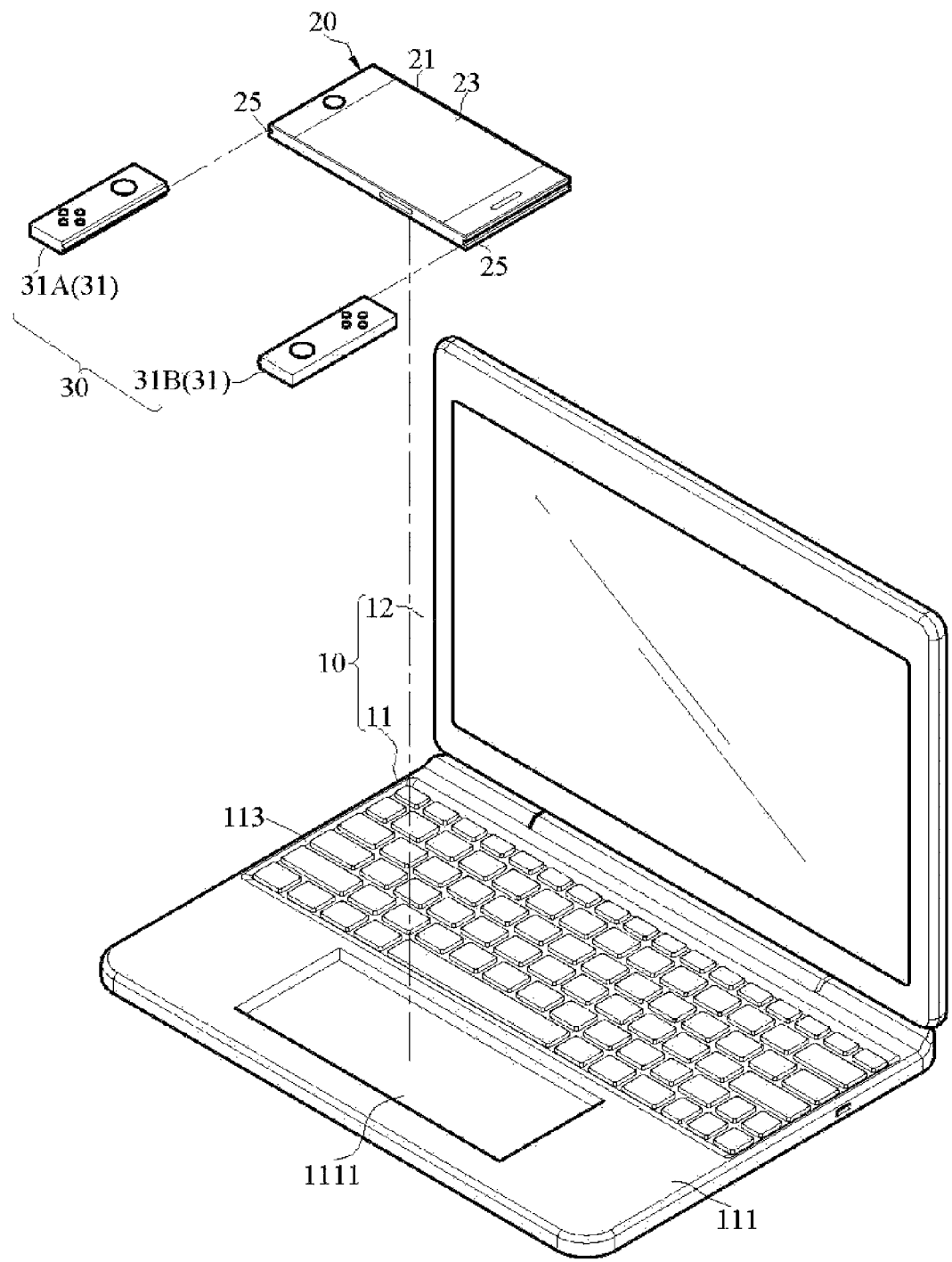
FIG. 1 is an exploded schematic view of an embodiment of an electronic system of the disclosure.

Please refer to FIG. 1. FIG. 1 is an exploded schematic view of an embodiment of an electronic system of the disclosure. The electronic system shown in FIG. 1 includes a first device 10, a second device 20 and a control device 30. The second device 20 is detachably disposed on the first device 10, and the control device 30 is disposed on the second device 20. When the control device 30 is disposed on the second device 20, it is also disposed on the first device 10 simultaneously with the second device 20. The first device 10, the second device 20 and the control device 30 are coupled to each other.

Accordingly, the first device 10 and the second device 20 are used alone or in cooperation, and the control device 30 respectively controls the first device 10, the second device 20 or other external electronic devices to provide various usage modes.

In an embodiment, the first device 10 is an electronic device that capable of control and operate independently by users. The first device 10 is, but not limited to, a notebook computer or a flip notebook computer. Herein, the first device 10 is a first part 11 and a second part 12 that are pivotally connected with each other.

In an embodiment, the first part 11 is a host, and the second part 12 is a screen. Further, the first part 11 of the first device 10 includes a casing 111, a first processor 112, a first control module 113 and a first wireless communication module 114. The first processor 112 is disposed inside the casing 111. The first control module 113 is electrically connected to the first processor 112 and disposed on the casing 111. The first wireless communication module 114 and the first processor 112 are electrically connected and disposed in the casing 111.

Specifically, in an embodiment, the first processor 112 includes a plurality of serial interfaces (COM ports), and the serial interfaces of the first processor 112 are configured to connect to other peripheral devices. Specifically, in an embodiment, the peripheral device is a screen, a speaker, an earphone, a mouse, a control stick or a printer. Herein, the casing 111 includes through holes, and the serial interfaces of the first processor 112 are received in the through holes for use.

In an embodiment, the first control module 113 is a keyboard. Herein, the first control module 113 is fixed to the surface of the casing 111.

In an embodiment, the second device 20 is a mobile electronic device which independently operates without cooperated with the first device 10. Specifically, the second device 20 is a mobile phone. Herein, the casing 111 of the first device 20 includes a receiving slot 1111, and the second device 20 is received in the receiving slot 1111.

Further, the second device 20 includes a second casing 21, a second processor 22, a second control module 23 and a second wireless communication module 24. The second processor 22 and the second wireless communication module 24 are received in the second casing 21. The second casing 21 is wrapped around the periphery of the second control module 23, the second control module 23 and the second wireless communication module 24 are electrically connected to the second processor 22. In an embodiment, the second control module 23 is a touch pad.

Furthermore, in order to enable the second part 12 to cover the first part 11, the depth of the receiving slot 1111 of the casing 111 is not less than the thickness of the second device 20. Preferably, when the second device 20 is received in the receiving slot 1111, the second control module and the surface, facing the second part 12, of the casing 111 are coplanar. Thus, the second device 20 is more in line with the usage habits of the general user when used as the touch pad of the first device 10.

In an embodiment, a sensing module 40 is further disposed in the receiving slot 1111 of the first device 10. Herein, the sensing module 40 includes a first sensing module 40A. The first sensing module 40A senses whether the second device 20 is received in the receiving slot 1111 and electrically connected to the first processor 112 or not. The first processor 112 controls the pairing state of the first device 10 and the second device 20 according to the sensing result of the first sensing module 40A or displays the information on the second part 12 for the user to select a usage mode.

Specifically, in an embodiment, the first sensing module 40A is a light sensing module or a weight sensing module. When the first sensing module 40A is a light sensing module, the first sensing module 40A is disposed on the circumferential side of the receiving slot 1111, and the first sensing module 40A includes a light source and a light receiver. When the light receiver receives light emitted by the light source, it is determined that the second device 20 is separated from the first device 10. When the light receiver does not receive light emitted by the light source, it is determined that the second device 20 is combined with the first device 10.

Therefore, when the second device 20 is not received in the receiving slot 1111, the light receiver receives the light emitted by the light source so as to determine that the second device 20 is not combined with the first device 10. When the second device 20 is received in the receiving slot 1111, the light emitted by the light source is blocked, and the light receiver does not receive the light emitted by the light source and determines that the second device 20 is combined with the first device 10.

In other embodiments, when the first sensing module 40A is a weight sensing module, the first sensing module 40A is disposed at the bottom of the receiving slot 1111 to sense the weight of the object received in the receiving slot 1111. The first sensing module 40A determines whether the second device 20 is combined with the inside of the first device 10 according to the weight in the receiving slot 1111.

In addition, in an embodiment, in order to ensure the combination stability of the second device 20 and the first device 10, a fasten unit is disposed between the first device 10 and the second device 20. The fasten unit is, but not limited to, a latch or a magnetic member, whereby the second device 20 is stably combined with the first device 10. Further, in this embodiment, the fasten unit is further matched with the sensing module, and the sensing module senses whether the fasten unit is in a fasten state or a separate state, so that the combined state of the first device 10 and the second device 20 is automatically determined according to the sensing result. Further, according to the combined state of the first device 10 and the second device 20, the automatic pairing and connecting information are further performed or displayed for the user to select.

Referring to FIG. 1, in an embodiment, the control device 30 is mechanically and detachably connected to the second device 20, and the control device 30 is communicated with the second device 20. In this embodiment, the control device 30 includes two controllers 31. In addition, two opposite sides of the second device 20 respectively include a combination structure 25 to detachably combine the controllers 31.

Figure 2:
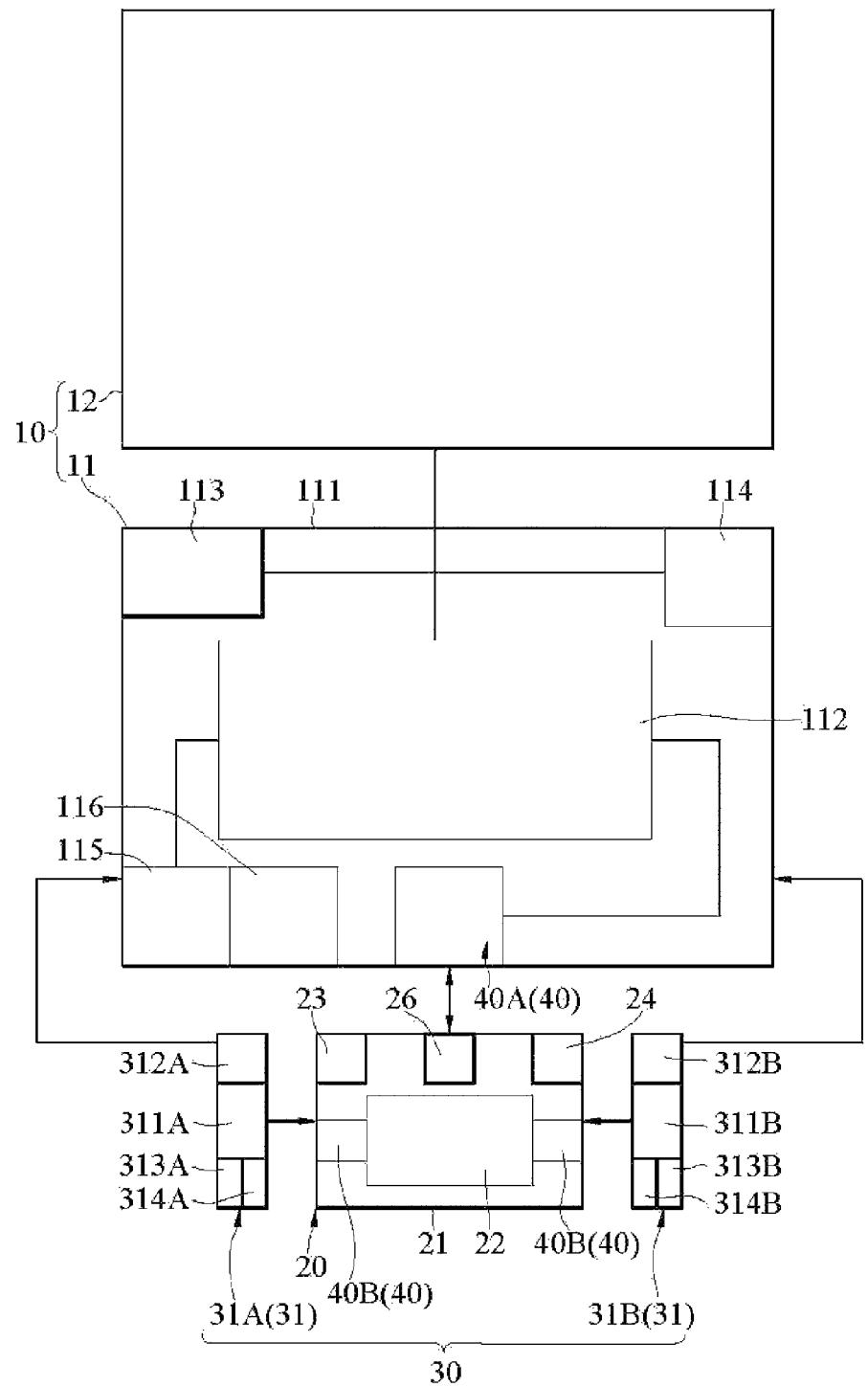
FIG. 2 is a system module diagram of an embodiment of an electronic system of the disclosure.

Herein, referring to FIG. 1 in combination with FIG. 2, the two controllers 31 are respectively used as independent control entities. Specifically, the two controllers 31 respectively include a first controller 31A and a second controller 31B. The first controller 31A includes a first computing core 311A, a third control module 312A and a third wireless communication module 313A. The third control module 312A, the third wireless communication module 313A and the first computing core 311A are electrically connected. The second controller 31B includes a second computing core 311B, a fourth control module 312B and a fourth wireless communication module 313B. The fourth control module 312B, the fourth wireless communication module 313B and the second computing core 311B are electrically connected.

Accordingly, a control instruction of the first controller 31A controls the first computing core 311A, and the third wireless communication module 312B transmits the instruction processed by the first computing core 311A to the first device 10 or the second device 20 or other external electronic devices E. Similarly, a control instruction of the second controller 31B controls the second computing core 311B, and the fourth wireless communication module 313B transmits the instruction processed by the second computing core 311B to the first device 10, the second device 20 or other external electronic devices E.

In an embodiment, referring to FIG. 1, the combination structure 25 of the second device 20 is a sliding slot, and the appearance shape of one side of the controller 31 corresponds to the inner surface shape of the sliding slot. Thus, the controller 31 is detachably and slidably disposed in the sliding slots on the two opposite sides of the second device 20, and is mechanically and detachably combined with the second device 20.

In an embodiment, the combination structure 25 of the second device 20 is a magnetic body. The two controllers 31 and the two opposite sides of the second device 20 are detachably combined by magnetic attraction. In another embodiment, the combination structure of the second device 20 is a magnetic sliding slot, so that the two controllers 31 and the second device 20 are detachably combined by the magnetic attraction and the sliding slots at the same time, thereby providing better structural combination stability.

In an embodiment, the two controllers 31 and the second device 20 are mechanically and detachably connected or connected through a physical communication interface. Herein, the combination structure 25 of the second device 20 is a female universal serial bus connection interface, and the two controllers 31 respectively include a male universal serial bus connection interface (USB). Thus, the two controllers 31 form a mechanical connection through the universal serial bus connection interface, and also complete the communication connection at the same time.

In an embodiment, when there is only a mechanical physical connection between the second device 20 and the two controllers 31, the communication connection between the second device 20 and the controller 31 of the control device 30 is, but not limited to, Bluetooth connection, wireless universal serial bus (WUSB) connection, radio frequency or infrared connection.

Further, the sensing module 40 further includes a second sensing module 40B. The second sensing module 40B is disposed on the second device 20 to sense whether the two controllers 31 are combined with the second device 20. The second sensing module 40B senses the state of the controller 31 to automatically change the usage mode, display the prompt information, or display a menu for the user to independently set the usage mode.

Figure 3:
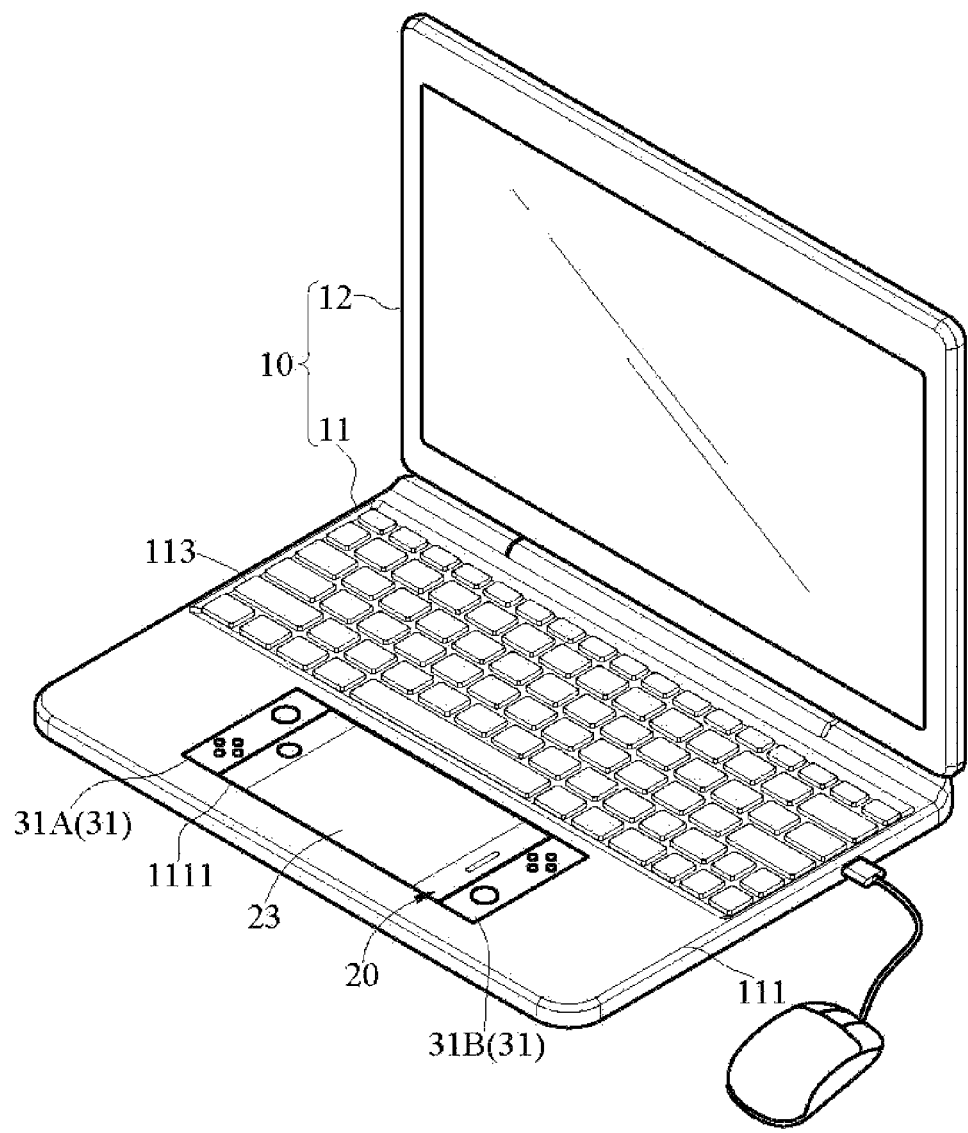
FIG. 3 is a usage mode of a second embodiment of an electronic system of the disclosure.

FIG. 3 shows a usage mode of a second embodiment of an electronic system of the disclosure when the second device 20 is combined with the first device 10 and is in communication connection with the first device 10. The second device 20 cooperates with the first device 10. Specifically, herein, the first processor 112 of the first device 10 executes an application in the first device 10, the second control module 23 of the second device 20 controls the first processor 112 of the first device 10 through the first wireless communication module 114 and the second wireless communication module 24, and the second device 20 is used as an extension of the first control module 113 of the first device 10 to control the first device 10 as a touch pad of the first device 10. Herein, in an embodiment, the computer game executed by the first processor 112 is operated and controlled by the second device 20.

Referring also to FIG. 3, in another usage mode in this state, the second device 20 cooperates with the first device 10. Specifically, the second processor 22 of the second device 20 executes an application in the second device 20, and the second processor 22 projects and displays the display image of the application onto the first device 10. Herein, the first control module 113 and the second control module 23 control the second processor 22 of the second device 20 through the first wireless communication module 114 and the second wireless communication module 24. Thus, the first device 10 is used as an extension of the display screen and the second control module 23 of the second device 20. Herein, in an embodiment, the mobile game executed by the second processor 22 is operated and controlled by the first device 10.

Figure 4:
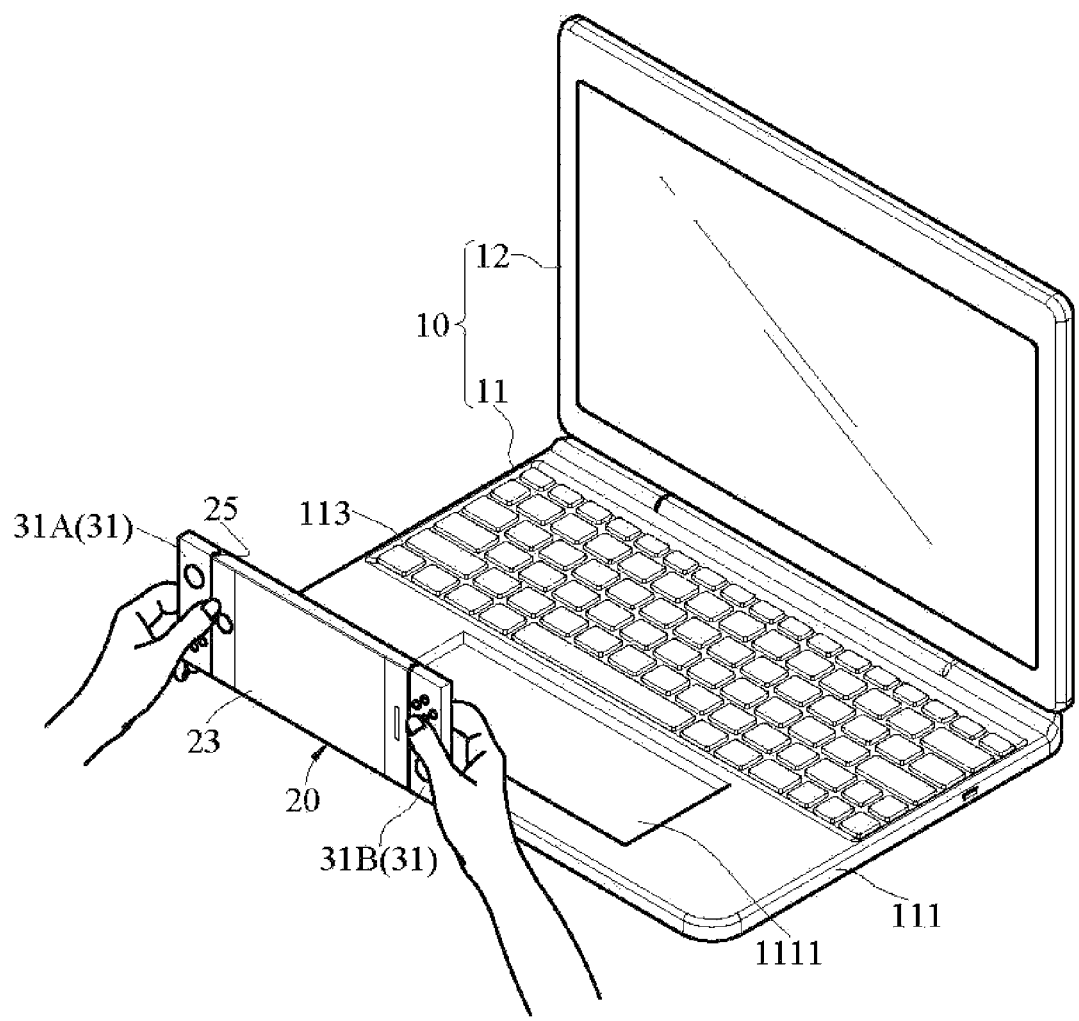
FIG. 4 is a usage mode of a third embodiment of an electronic system of the disclosure.

Definitely, in the foregoing embodiments, when the application in the second device 20 is executed, the second device 20 is possibly removed from the first device 10 together with the control device 30 as shown in FIG. 4. The user controls the second device 20 through the second control module 23 and the two controllers 31 of the control device 30. In this embodiment, the two controllers 31 of the control device 30 are used as handles in the game to meet the usage requirements for handles control.

In addition, following the foregoing embodiment, when needed, the user removes the two controllers 31 of the control device 30 from the second device 20, and uses the second device 20 alone, in an embodiment, as a mobile device for communication. Herein, the first device 10 is also able to be used independently without the second device 20 and the control device 30.

Figure 5:
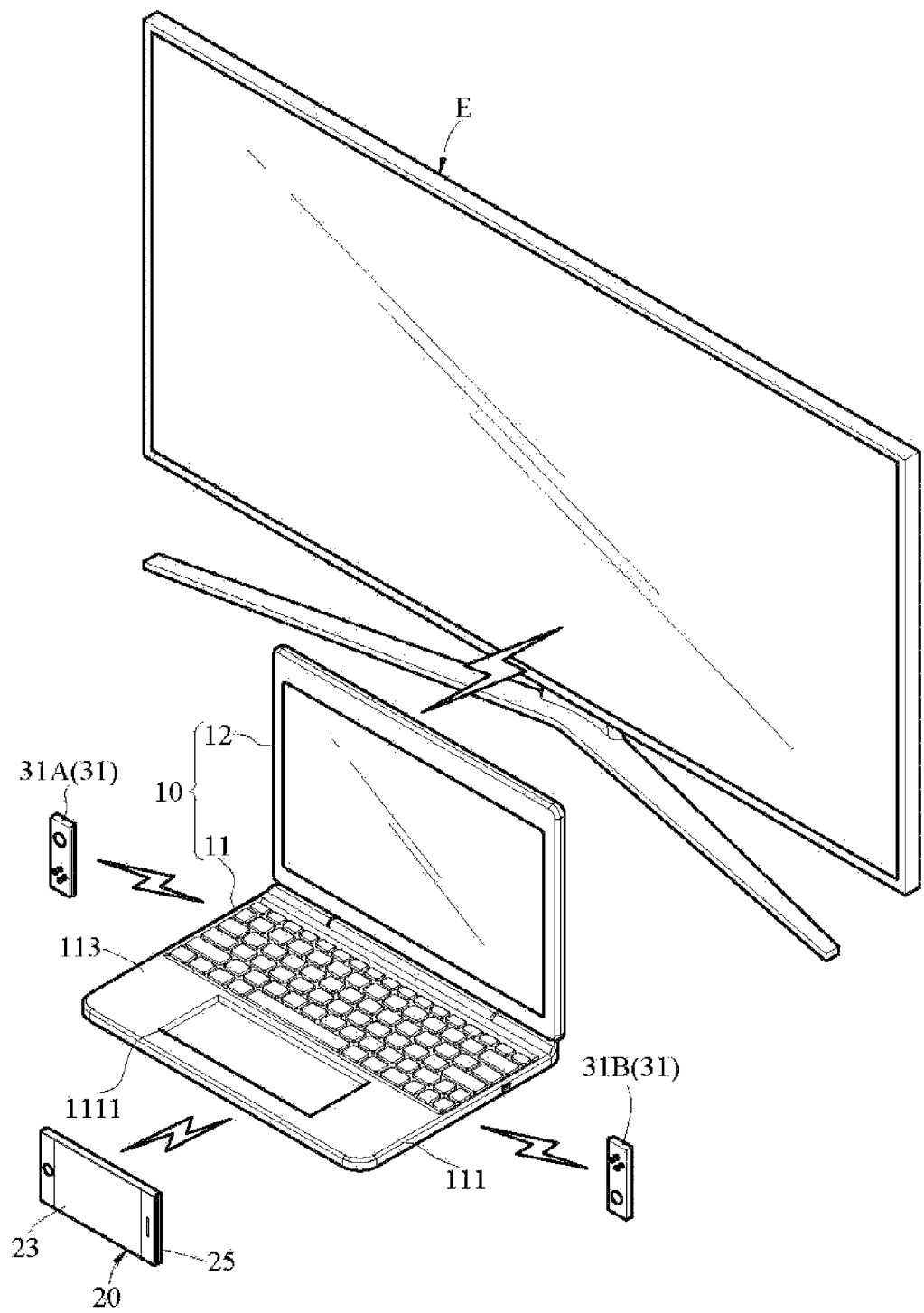
FIG. 5 is a usage mode of a fourth embodiment of an electronic system of the disclosure.

Next, referring to FIG. 5, FIG. 5 is a use state of a fourth embodiment of an electronic system of the disclosure. When the second device 20 and the control device 30 are both separated from the first device 10, the first device 10 operates independently. The first device 10 is paired and connected with the second device 20 and the two controllers 31 of the control device 30. Herein, the second device 20 and the two controllers 31 of the control device 30 also operate the application executed in the first device 10. Specifically, in an embodiment, this state is a three-player battle mode for the application executed by the first device 10 through the second device 20 and the two controllers 31. Further, in this usage mode, the first device 10 is able to further connect to the external electronic device E by wire or wirelessly. In an embodiment, the external electronic device E is a television or other display device, and thus, the image of the first device 10 is amplified and displayed onto the external electronic device E.

Figure 6:
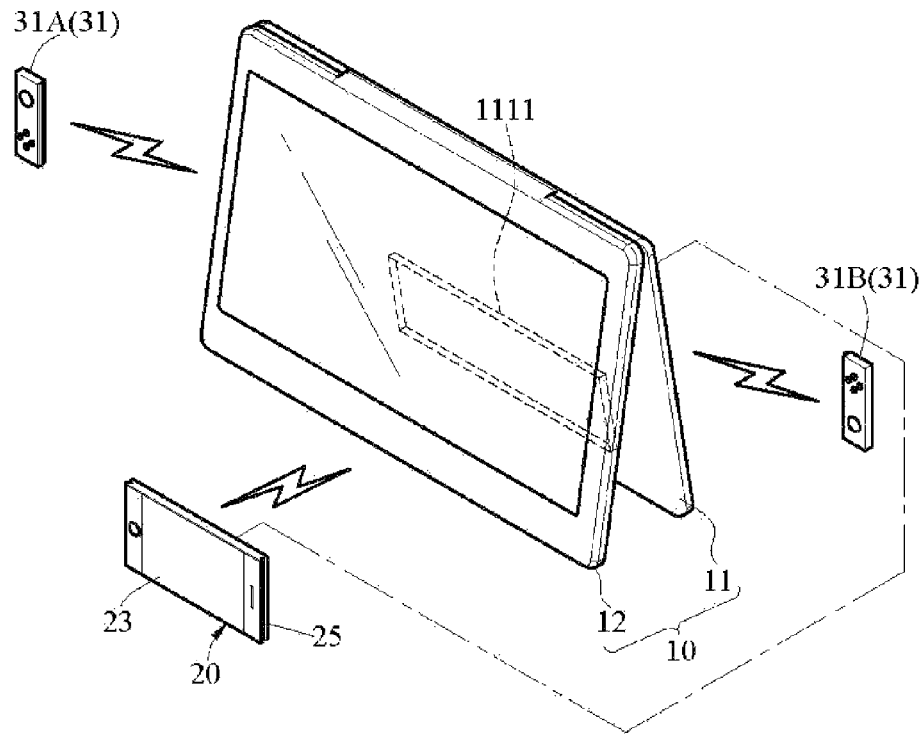
FIG. 6 is a usage mode of a fifth embodiment of an electronic system of the disclosure.

Herein, the first device 10 is not limited to the embodiments that shown in FIG. 1 and FIG. 3 to FIG. 5. Referring to FIG. 6, in an embodiment, the first device 10 is pivoted for 360 degrees between the first part 11 and the second part 12. Therefore, in the control mode as described in the foregoing embodiment, the first device 10 is able to be operated in a standing mode.

In another embodiment, when the second device 20 and the control device 30 are both separated from the first device 10, the first device 10 operates independently. The second device 20 and the two controllers 31 of the control device 30 are paired and connected with other external electronic device E through the second wireless communication module 24, the third wireless communication module 313A and the fourth wireless communication module 313B. In an embodiment, the external electronic device E is, but not limited to, a gaming device. Accordingly, the second device 20 and the two controllers 31 of the control device 30 perform as controllers to other electronic devices.

Furthermore, in an embodiment, the second device 20 and the two controllers 31 respectively include a gravity sensor (G-sensor). In this way, the second device 20 and the two controllers 31 are used as handles of a motion sensing game.

In summary, the first device 10 and the second device 20 independently function as portable electronic devices. In addition, the first device 10 and the second device 20 further cooperate as an extension device of each other to provide different operating modes. In addition, the controllers 30 detachably combined with the second device 20 respectively control the first device 10 and the second device 20 to meet the handle use requirements in different usage modes.

Furthermore, referring to FIG. 2, the first part 11 of the first device 10 further includes a first power module 115 and a charging module 116, the first power module 115 is electrically connected to the first processor 112 and the charging module 116. In addition, the second device 20 further includes a second power module 26, and the second power module 26 is electrically connected to the second processor 22 to provide the second device 20 power. The first controller 31A further includes a third power module 314A, and the third power module 314A is electrically connected to the first computing core 311A to provide the first controller 31A power. The second controller 31B further includes a fourth power module 314B that electrically connected to the second computing core 311B to provide the second controller 31B power.

Herein, when the first device 10 is in communication with the second device 20, the first controller 31A and the second controller 31B, the charging module 116 of the first device 10 charges the second power module 26, the third power module 314A and the fourth power module 314B. In this way, when the second device 20, the first controller 31A and the second controller 31B are combined with the first device 10, charging is performed simultaneously.

Figure 7:
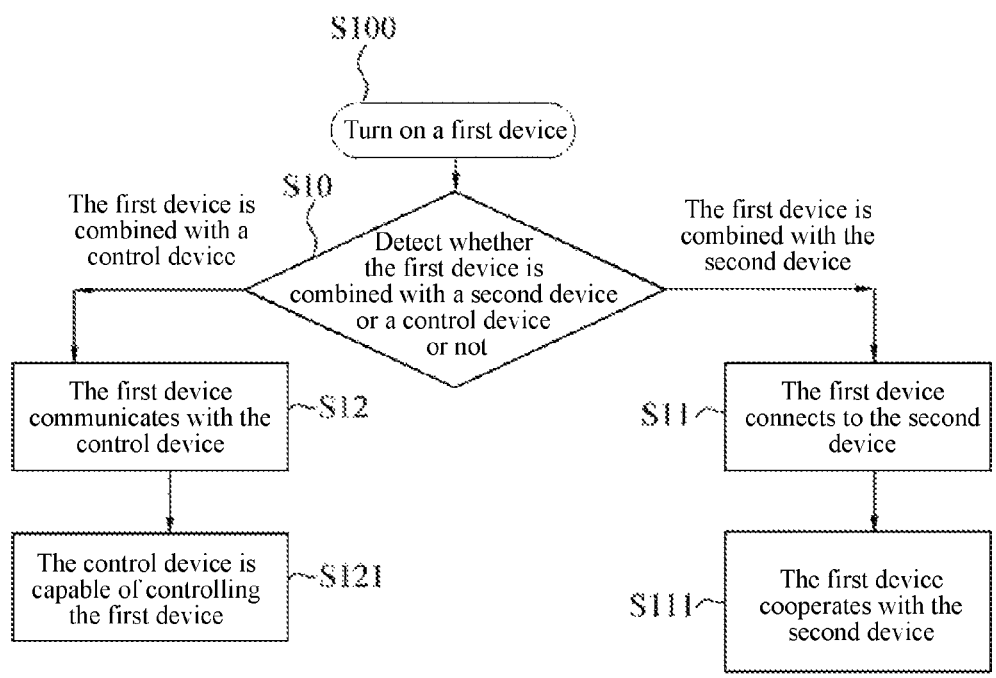
FIG. 7 is a flow chart showing the steps of an embodiment of a method of controlling an electronic system of the disclosure.

Referring to FIG. 7, FIG. 7 is a flow chart showing the steps of an embodiment of a control method of a electronic system of the disclosure. The control method of the electronic system shown in FIG. 7 includes turning on a first device (step S100); detecting whether the first device is combined with a second device or a control device (step S10) or not; when the first device is detected as combined with the second device, the first device connects to the second device (step S11), and the first device cooperates with the second device (step S111); and when the first device is detected as combined with the control device, the first device communicates with the control device (step S12), and the control device controls the first device (step S121).

In an embodiment, the step of turning on the first device (step S100) is starting the first device 10 or the second device 20. Where the first processor 112 of the first device 10 or the second processor 22 of the second device 20 triggers.

In an embodiment, the step of detecting whether the first device is combined with the second device or a control device (step S10) is performed when the first device is in operation. Specifically, when the first processor 112 of the first device 10 is in operation, the first sensing module 40A constantly detects whether the second device 20 is combined with the first device 10. When the second processor 22 of the second device 20 is in operation, the second sensor module 40B constantly detects whether the first controller 31A and the second controller 31B are combined with the second device 20.

Thus, when the second device 20 is separated from the first device 10, the state change between the second device 20 and the first device 10 is detected immediately. Further, when the state changes, one of the first device 10 or the second device 20 displays information for the user to select a change of the operation mode. In addition, when the first controller 31A or the second controller 31B is separated from the second device 20, the state change between the first controller 31A, the second controller 31B and the second device 20 are detected immediately. Further, when the state changes, the second device 20 displays information for the user to select a change of the operation mode.

As described above, the disclosure herein achieves software pairing by the combination of hardware, thereby providing different usage modes to meet various usage requirements.

The above-described embodiments and/or implementations are merely illustrative of preferred embodiments and/or implementations for practicing the techniques of the disclosure, and are not intended to limit the embodiments of the techniques of the disclosure in any manner, and any person skilled in the art makes various variations or modifications to obtain other equivalent embodiments without departing from the scope of the technical means disclosed herein, and all such embodiments should still be considered to be substantially the same techniques or embodiments as the disclosure.

What is claimed is:

1. An electronic system, comprising:
   a first device, having a first processor and a first control module, wherein the first control module is electrically connected to the first processor;
   a second device, detachably disposed on the first device, wherein the second device has a second processor and a second control module, and the second control module is electrically connected to the second processor; and
   a control device, detachably connected to the second device, wherein the first device, the second device and the control device are coupled to each other.

2. The electronic system according to claim 1, wherein the control device comprises a first controller and a second controller, and the first controller and the second controller are respectively detachably disposed on two opposite sides of the second device.

3. The electronic system according to claim 2, wherein the first controller comprises a first computing core and a third control module, and the third control module is electrically connected to the third processor; and the second controller comprises a second computing core and a fourth control module, and the fourth control module is electrically connected to the second computing core.

4. The electronic system according to claim 3, wherein the first device, the second device and the control device are in communication connection with each other.

5. The electronic system according to claim 2, wherein the two opposite sides of the second device respectively comprise a sliding slot, and the first controller and the second controller are respectively slidably connected to the sliding slots of the second device.

6. The electronic system according to claim 2, wherein the first controller and the second controller are magnetically connected to the second device.

7. The electronic system according to claim 2, wherein the second device, the first controller and the second controller respectively comprise a corresponding communication connection interface, and the second device, the first controller and the second controller are connected to each other respectively through the communication connection interfaces.

8. The electronic system according to claim 1, wherein the first device comprises a receiving slot, and the second device and the control device are received in the receiving slot.

9. A control method of an electronic system having a first device, a second device and a control device, comprising:
   detecting whether the first device is combined with the second device or the control device or not, where the first device and the second device are capable of operating independently;
   when the first device is detected as combined with the second device, the first device connects to the second device, and the first device cooperates with the second device; and
   when the first device is detected as combined with the control device, the first device communicates with the control device, and the control device controls the first device.

10. The control method of an electronic system according to claim 9, wherein when the first device operates, the first device is detected to combine with the second device or the control device.

11. The control method of an electronic system according to claim 9, when the first device is separated from the second device, one of the first device or the second device displays information for selecting a connection state and a usage mode of the first device and the second device.

\* \* \* \* \*